June 4, 1968  U. WOSSAGK  3,386,172
WEAPON SIGHT LEAD DETERMINING DEVICE
Filed July 7, 1965                    4 Sheets-Sheet 1

INVENTOR
*Ulf Wossagk*

By *MuGlaw and Toren*

ATTORNEYS

INVENTOR
*Ulf Wossagk*

June 4, 1968 — U. WOSSAGK — 3,386,172
WEAPON SIGHT LEAD DETERMINING DEVICE
Filed July 7, 1965 — 4 Sheets-Sheet 3

INVENTOR
*Ulf Wossagk*

By McGlew and Toren

ATTORNEYS

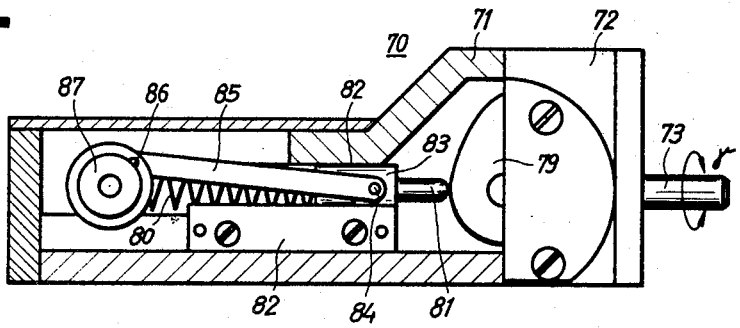
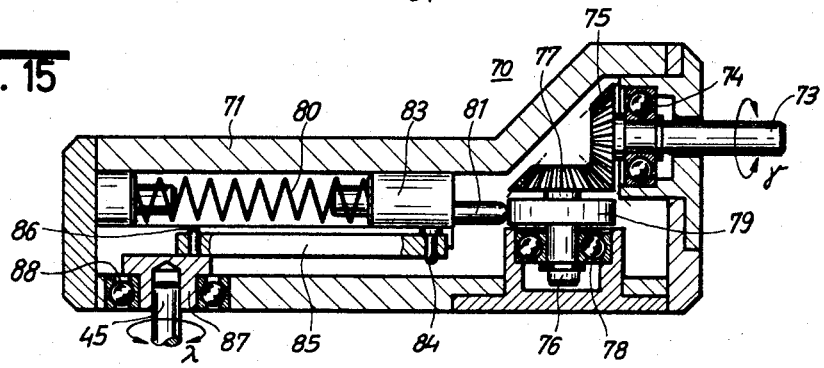
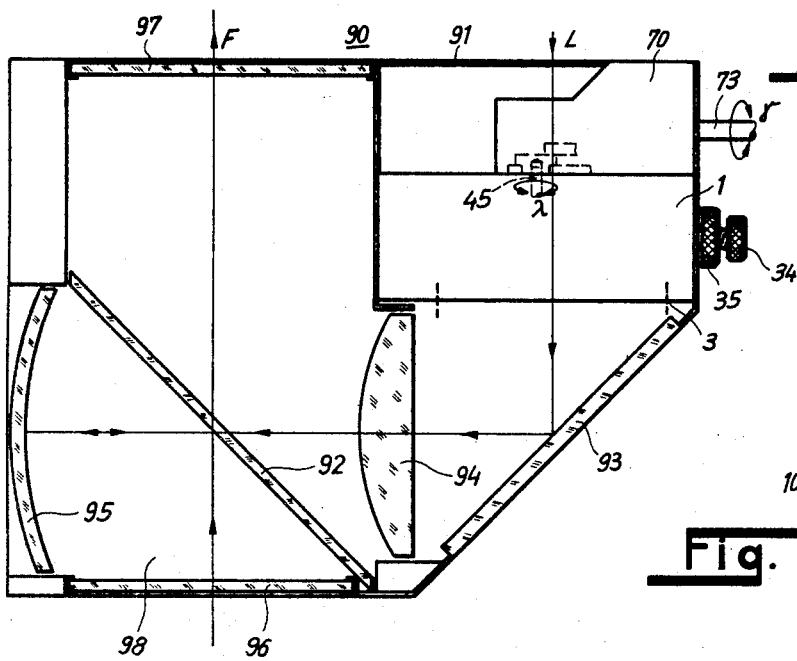
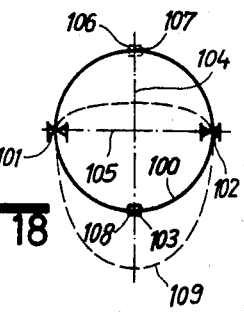
INVENTOR
*Ulf Wossagk*
By
ATTORNEYS 2,386,172
Patented June 4, 1968

3,386,172
WEAPON SIGHT LEAD DETERMINING DEVICE
Ulf Wossagk, Munich, Germany, assignor to Bolkow Gesellschaft mit beschrankter Haftung, Munich, Germany
Filed July 7, 1965, Ser. No. 470,165
Claims priority, application Germany, July 11, 1964, B 77,635
21 Claims. (Cl. 33—49)

ABSTRACT OF THE DISCLOSURE

A device for determining the lead for sighting upon a flying target, in which a group of target flight direction lines are overlaid by an adjustable lead curve constituted by a flexible elastic rod or loop. The curvature and length of the rod or loop is regulated by adjusting the rotational position of the lateral holding pins and the vertical position of an intermediate guide member according to target velocity and weapon characteristics, respectively.

This invention relates to lead determining devices for the sights of weapons firing at flying targets and, more particularly, to an improved lead determining device adjustable to all target velocities and all trajectories with respect to the angle of the plane of flight, in addition to being adjustable with respect to ballistic characteristics of the weapon or to the ballistics characteristics of different weapons.

It is known to provide a lead determining device wherein the apparent direction of flight is represented, in the field of view of a telescopic sight or of a reflector sight, as a radially extending division mark. The lead is indicated by the intersection of a radially extending division mark with one of several lead curves, also arranged in the field of view of the sight. The respective directions of the division marks and the positions of the lead curves are determined by associated computing gears, from the mathematical relations evolved during the course of determining the laying data for elevation and azimuth of the weapon.

It is also known to provide lead determining devices on sights which are adjusted in dependence only on the elevating movement of the weapon, as disclosed, for example, in German Patent No. 1,110,554. In these cases, the lead determining devices provide, for certain ballistic characteristics for which the lead curves have been determined, an exact indication of the lead, provided the velocity of the target, also used as a basis for determining the lead curves, is correctly determined. With different velocities of the target, the gunner must interpolate between two lead curves, since a larger number of lead curves would make the field of view of the sight too cluttered. The lead curves of sights of this type are furthermore so laid out, for mean determined trajectory with respect to the flight plane, that they can still supply sufficiently accurate lead values even with minor deviations. However, the lead curves cannot be laid out in such a manner as to yield a sufficiently accurate lead reading for major deviations, for example, those in the midpoint of the range.

An object of the present invention is to provide a lead determining device including a lead curve variable in curvature and arc length to an extent such that it is useable for all target velocities and all trajectories relative to the plane of the flight.

Another object of the invention is to provide a lead determining device including a lead curve sufficiently variable in curvature and arc length that it can be adapted to several ballistic characteristics of the weapons, or to ballistic characteristics of different weapons.

A further object of the invention is to provide a device by means of which a lead curve in weapon sights is simulated by means of a flexible elastic rod whose curvature is variable.

Yet another object of the invention is to provide a device in which a lead curve in weapon sights is simulated by means of a flexible elastic rod whose curvature and arc length is variable in dependence on the elevation of the weapon.

A further object of the invention is to provide a device of the type mentioned above in which one end of the flexible elastic rod is clamped in a pin rotatable about an axis perpendicular to the rod, and the other end of the flexible elastic rod extends through a radius link positioned on a bearing pin also arranged for rotation about an axis perpendicular to the rod.

Still another object of the invention is to provide a device including an elastic rod mounted in the manner just mentioned and in which either the first mentioned pin may be rotated in accordance with the elevation of the weapon, or both pins may be rotated synchronously in opposed directions in accordance with such elevation.

Yet a further object of the invention is to provide a device of the type mentioned including a stop engageable with the flexible elastic rod intermediate its ends and displaceable along the perpendicular bisector of the chord subtending the arc and joining the axes of the two pins.

A further object of the invention is to provide a device of the type mentioned in which the stop is provided with an indicator having a scale arranged in the field of view of the sight, or in which the driving mechanism for the stop is provided with an indicating means.

Still another object of the invention is to provide a device of the type mentioned in which the flexible elastic rod is displaceable between two spaced parallel transparent plates which confine the rod during adjustment of its curvature and arc length.

A further object of the invention is to provide a lead determining device of the type described in which the pins mounting the rod are supported on adjustable slides operatively connected with the stop.

Yet another object of the invention is to provide a lead determining device of the type including a flexible elastic rod mounted for adjustment of its curvature, and in which the rod is designed as a continuous ring supported, at diametrically opposed points, in radius links mounted for rotation on pins having axes extending at right angles to the plane of the ring.

A further object of the invention is to provide a lead determining device of the type mentioned in which adjustment of the curvature of the rod is effected by a follower engaging the rod intermediate its support points and either in the field of view of the sight or outside the field of view of the sight.

Yet another object of the invention is to provide a lead determining device of the type mentioned as including a flexible elastic rod positioned between a pair of spaced parallel transparent plates, for adjustment of its curvature, and in which at least one plate is provided with radially extending division marks.

Still a further object of the invention is to provide a lead determining device of the type mentioned, as including a flexible elastic rod whose curvature can be adjusted, and in which the flexible elastic rod is reproduced in the field of view of a reflector sight.

For an understanding of the principles of the invention, reference is made to the following description of typical embodiments thereof as illustrated in the accompanying drawings.

In the drawings:

FIG. 15 is a sectional view through the cam mechanism for operating the lead determining device;

FIG. 16 is a part outside view and part sectional view of the cam mechanism, in a plane at right angles to that of FIG. 15;

FIG. 17 illustrates the lead determining device of the invention as mounted on a reflector sight, the lead determining device being illustrated in simplified form and the reflector device being illustrated partially in section; and FIG. 18 is a somewhat schematic view illustrating an alternate embodiment of the flexible elastic rod, its support and the drive means therefor.

Figure 1:
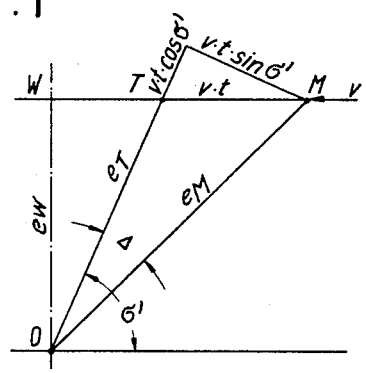
FIGS. 1 through 11 are diagrams illustrating the theory of the invention.

The theory underlying the invention will first be described with particular reference to FIGS. 1 through 11. In FIGS. 1 through 11, the following quantities are used for calculating the lead angle $\Delta$ in degrees:

$e_T$ (meters) = range of target
$e_W$ (meters) = range of midpoint
$v$ (meters per second) = velocity of target
$t$ (sec.) = flight time of projectile as a function to be determined from a firing table
$\sigma'$ (degrees) = azimuth in the plane of flight
$t_T$ (sec.) = flight time of projectile within the target range
$t_W$ (sec.) = flight time of projectile in the midpoint range According to FIG. 1, we thus have:

$$\tan \Delta = \frac{v \cdot t_T \cdot \sin \sigma'}{e_T + v \cdot t \cdot \cos \sigma'} \quad (1)$$

The foregoing relation applies up to the midpoint range.

By reformation of Equation 1, we obtain the following equation:

$$\Delta = \text{arc cot}\left[\left(\frac{e_T + \cos \sigma'}{v \cdot t_T}\right) \text{cosec } \sigma'\right] \quad (2)$$

In the foregoing, $t$ characterizes the values for the point of the impact T, and M indicates the measuring point.

In the midpoint range, where $e_T = e_W$ and $\sigma' = 90°$, the lead angle is always the same irrespective of whether the target is passing at a constant elevation or is an overflight. This lead angle in the midpoint range, hereinafter referred to as $\Delta_W$ = midpoint lead, has the following value:

$$\Delta_W = \text{arc tan } \frac{v \cdot t_W}{e_W} \quad (3)$$

Figure 2:
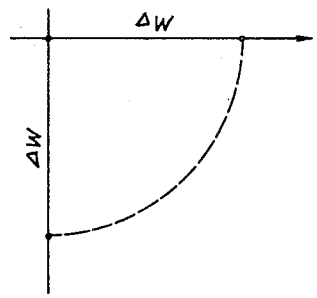

FIG. 2 shows this value $\Delta_W$ as it appears in the weapon sight. The value $\Delta_W$ in degrees must be converted to the predicting interval $\Delta_W$ in millimeters in the sight. In this case, purely optical quantities, such as magnification and focal length, are the controlling determinants. Thus, this conversion is a result of a strictly numerical conversion factor, and can be written as follows:

$$\Delta \text{ (in mm.)} = R \cdot \Delta \text{ (in degrees)} \quad (4)$$

From FIG. 2 it can be seen that this value $\Delta_W$[mm.] appears on the vertical axis for an overflight, while it appears on the horizontal axis for a passing flight.

In order to obtain the lead values $\Delta_W$[mm.] in the course of target tracking from pick-up to the midpoint, the apparent flight angle $\delta$ has to be introduced. This flight angle is a function of the azimuth angle $\sigma'$ and of the elevation angle $\gamma$. The vertical angle $\gamma$ is, in the midpoint range where $\gamma_W$ equals T, the angle of inclination of the trajectory plane, i.e. a plane which contains the trajectory and which passes through the position of the weapon. This is represented in the following equation:

$$\tan \delta = \frac{\cot \text{an } T}{\cos \sigma'} \quad (5)$$

This is the angle at which the target seems, to the gunner, to be flying toward the sighting center. In an overflight $\delta$ is always zero, and in a passing flight $\delta_W$, which is the apparent flight angle in the midpoint range, is 90°.

Figure 3:
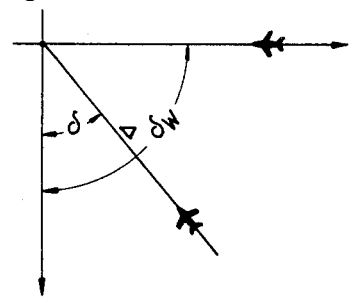

From FIG. 3, it can be seen that the flight angle $\delta$ together with the predicting interval $\Delta$ clearly determines the point at which the weapon was sighted at the instant of firing. It is sufficient if the gunner lets the target fly, at any moment, toward the center, and if the predicting interval $\Delta$ is constantly fed into the sight, the predicting interval $\Delta$ thus is the extension of the longitudinal axis of the target through the sight center.

Figure 4:
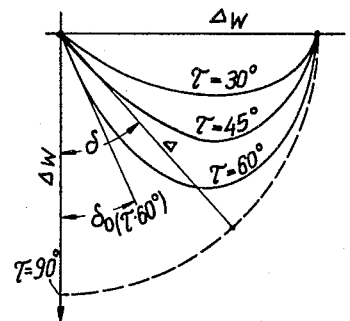

If curves are established corresponding to $\Delta = f(\delta)$, that is the predicting intervals, through the apparent flight angle, the course of the lead from the pick-up to the midpoint may be determined. In FIG. 4, these curves are represented for different angles T of the plane of flight. From FIG. 4, it can be seen that the target is picked up at an infinite distance at the angle $\delta = \delta_0$, with $\delta$ then increasing to 90° provided the target is making a passing flight.

Figure 5:
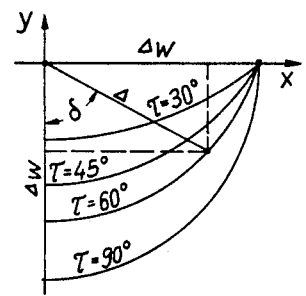

The object now is to simulate this lead course as a function of the vertical angle $\gamma$ in such a manner that, no matter what the angle of inclination of the plane of flight, a sufficiently accurate lead value always can be obtained. If the curves $\Delta(\delta)$ for different T values are represented in Cartesian coordinates $\bar{x}$, $\bar{y}$, there are obtained curves in the form of circular arcs, as shown in FIG. 5. We then have:

$$\bar{x} = \Delta \cdot \sin \delta$$
$$\bar{y} = \Delta_T - \Delta \cdot \cos \delta$$

The center of the coordinate system for $\bar{x}$, $\bar{y}$, moved along the negative $y$ axis for various T values, is at $y = \Delta_T$.

Figure 6:
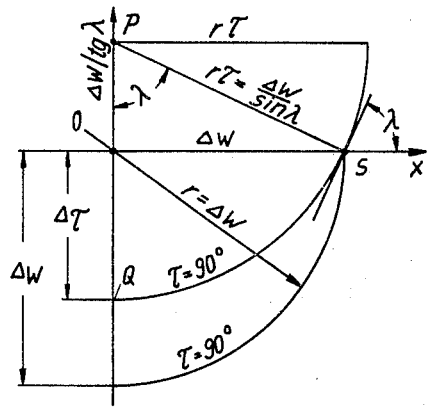

In order to reproduce the $x$–$y$ lead curves shown in FIG. 5, there may be used a flexible elastic rod, suitably clamped and guided, as shown in FIG. 6 in simplified form. Starting from a circle at T = 90°, and having the radius $\Delta_W$, the intersection of the rod with the $y$-axis, moves along the latter according to the lead function $$\Delta = \text{arc tan } \frac{v \cdot t_T \cdot \sin \gamma}{e_T + v \cdot t \cdot \cos \gamma} \quad (1b)$$

where the vertical angle is equal to the azimuth (overflight).

The flexible elastic rod, guided at point S in a radius link rotating about the point S, varies the angle of intersection $\lambda$ with the $x$-axis from $\lambda = 90°$, at T = 90°, to $\lambda = 0°$, at T = 0°. This results in circular arcs about the point P with the radius $$r_T = \frac{\Delta_W}{\sin \lambda}$$

where the point P is displaced by the amount $$W \frac{\Delta_W}{\tan \lambda}$$

from 0 in the positive direction of the $y$-axis.

If the guide at point S is turned in accordance with the function $\lambda = f(T)$, there is obtained, on the $y$-axis, the predicted interval $$\Delta_T = f(T)$$

The rod, clamped at the points Q and S, now reproduces in a very good manner, although not mathematically exact, the lead course for a passing flight, with the angle T of the plane of inclination. For an overflight, $\Delta_T$ is the lead for $\gamma = T°$ during the flight of the target. It is now necessary to find the respective functions $\lambda = f(\gamma)$ and $\gamma = f(T)$, according to which the rod guide at the point S must be turned in order to satisfy the foregoing equation.

In accordance with FIG. 6, we have the following equation:

$$\tan \Delta_T = \frac{v \cdot t}{e_W}\left(\frac{1}{\sin \lambda} - \frac{1}{\tan \lambda}\right) \quad (7)$$

The actual predicted interval, however, must originate from the following equation:

$$\tan \Delta_T = \frac{v \cdot t \cdot \sin \Upsilon}{e_W + v \cdot t \cdot \cos \Upsilon} \quad (1c)$$

By equating and re-forming Equation 1c, and if the quantity $v \cdot \frac{t}{e_W}$ is made equal to $p$, the following equation is obtained:

$$\lambda = 2 \cdot \arctan \frac{\sin \Upsilon}{1 + p \cdot \cos \Upsilon} \quad (8)$$

Figure 7:
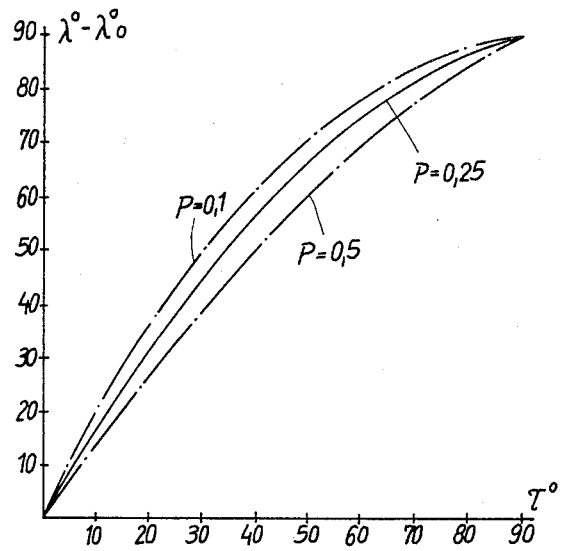

For a provided adjusting range of the device under investigation of $\Delta_W$ max.$=25$ mm. and $\Delta_W$ min.$=5$ mm. there is obtained, with an optical conversion factor of about 1 as is characteristic of reflector sights, from the focal length of the magnifying lens and of the magnification: $p_{max}=0.5$, $p_{min}=0.1$. Using these values, there may be selected a mean value $p_m$ of about 0.25. The deviation of the curves for other possible values of $p$ is shown in FIG. 7. The maximum error resulting from the selection of $p_m=0.25$ is about 10% with $\Upsilon=45°$. However, since the estimated assumptions of the gunner, like $v$ and $e_W$, can have greater errors, and as the error due to the selection of $p_m$ becomes infinitely small toward the midpoint, it is negligible.

Figure 8:
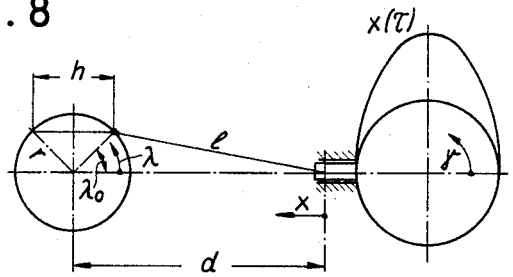

FIG. 8 shows the principle of this control. The angular displacement $\gamma$ is converted, by a cam having a function $x(\Upsilon)$ into the linear movement $x$, which provides an angular displacement $\lambda$ of a crank of the breech mechanism of the weapon.

Due to the construction of the crank mechanism, there results the following function:

$$\lambda = \arccos \frac{\gamma^2 + (d-x)^2 - 1^2}{2r(d-x)} \quad (9)$$

Figure 9:
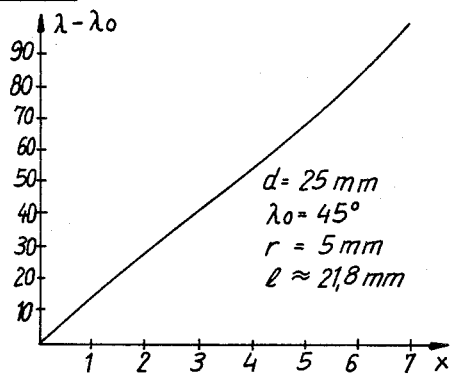
Figure 10:
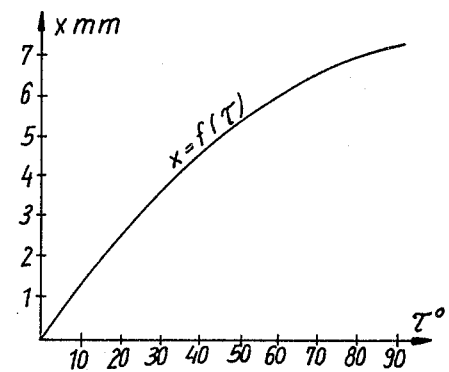
Figure 11:
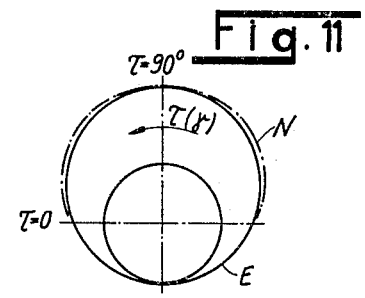

This latter function is nearly rectilinear, as can be seen from FIG. 9. From Equations 8 and 9, where the value $p$ equals $p_m$ substituted, there is obtained a cam curve $x(T)$, as illustrated in FIG. 10, FIG. 11 illustrates such a cam, and it will be noted that this cam N can be approximated very well by an eccentric E. The cam stroke may be represented by the following equation:

$$h = \gamma\sqrt{2} \quad (10)$$

The foregoing considerations serve as a basis for the construction of a lead determining device of the invention, and which has the following advantages, in tracking all overflights and passing flights, as compared to similar sights where the lead is fed into the weapon starting from a vertical angle:

(1) Very accurate lead for all values of $\Upsilon$ from 0° to 90°

(2) Continuous adjustment of the lead determining means to any target velocity on the basis of a certain ballistic characteristic.

(3) Low cost of component elements.

Figure 12:
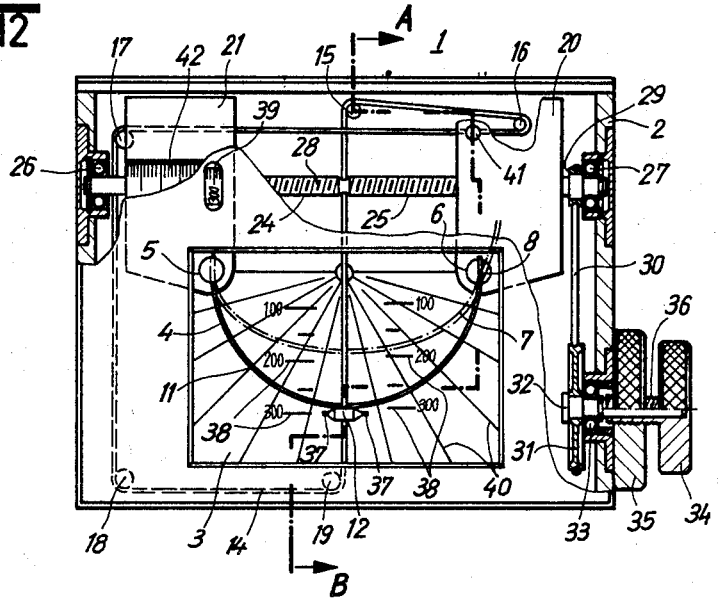
FIG. 12 is a view of a lead determining device embodying the invention, partly broken away, as viewed by the gunner.

Referring now to FIGS. 12 through 17, which illustrate one embodiment of the invention, a housing 2 has a window 3 corresponding in its dimensions and configuration to the field of view of a sight associated with the lead determining device. Looking through the window 3, there can be seen an arcuate flexible elastic rod 4 clamped between two rotary bearing pins 5 and 6, and whose curvature simulates a variable lead curve. A second position of rod 4 is illustrated in broken lines at 7, the position 7 of the rod 4 corresponding to another setting of the elevation or vertical angle of the weapon. One end of rod 4, namely the left end as viewed in FIG. 12, is clamped in pin 5, whereas the other or right end of rod 4 extends through a radius link 8 secured to the pin 6. Bearing pin 5 is rotatable in accordance with the vertical angle or elevation of the weapon by means of the driving means represented in FIGS. 13 through 16, with the curvature of rod 4 and length of its arc between pins 5 and 6 being variable.

Figure 13:
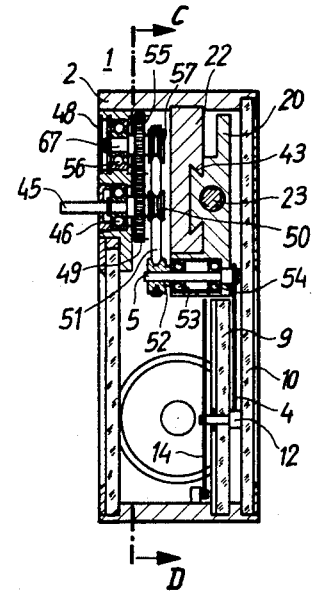
FIG. 13 is a transverse sectional view of the device shown in FIG. 12, taken on the line A–B of FIG. 12.

Rod 4 is guided between two spaced parallel plane transparent discs or plates 9 and 10, as best seen in FIG. 13. One plate or disc 9 has radial division marks 40 indicating the apparent direction of flight. Each intersection of rod 4 with a division mark 40, such as the intersection 11, supplies a lead value for a target moving at a constant velocity along the particular division mark 40.

In order to take into consideration a different velocity of the target or a different ballistic characteristic of the weapon, bearing pins 5 and 6 are supported on respective mutually displaceable slides 20 and 21. In addition, the device includes a stop 12 which is displaceable along the perpendicular bisector of the chord subtending the arc of rod 4 secured between the bearing pins 5 and 6. Stop 12 is guided between discs or plates 9 and 10 in a slot 13 in plate or disc 10 and is displaced by means of a flexible element, such as a rope or cord 14, secured thereto.

Rope or cord 14 is trained over guide rollers 15 and 19 and is secured to slide 20 by means of a clip 41 so that it is displaced during movement of slide 20. Slides 20 and 21 are slidably supported, by means of dovetail guides 43 (FIG. 13), on a plate 22 fixed in housing 2, so that the slides may be mutually displaced. Slides 20 and 21 have respective oppositely threaded bores 23 (FIG. 13) through which there extends a shaft 28 formed with corresponding threads 24 and 25. Shaft 28 is supported in housing 2 by means of anti-friction bearings 26 and 27, and has secured thereto a pulley 29 driven, through a belt 30, by a larger diameter pulley 31.

Pulley 31 is secured to shaft 32 supported in anti-friction bearings 33 in housing 2. Shaft 32 may be rotated manually by turning a knob 34 secured thereto, and the selected setting may be locked by means of a lock knob 35 which is threaded onto a threaded portion 36 of shaft 32 and which can be tightened against housing 2.

For each selected setting, flexible elastic rod 4 forms a semicircle for a plane of flight having an angle of inclination of $\Upsilon = 90°$. This semicircle is formed with respect to the support points 5 and 6 for rod 4, with stop 12 bearing on elastic rod 4 at the apex of the semicircle.

For the purpose of indicating the estimated or measured velocity of the target, which is fed into the lead determining device, stop 12 is provided with indicator means 37 cooperable with scales 38 calibrated in target velocities for two different ballistic characteristics of the weapon. Scales 38 are arranged in the field of view of the sight, and are applied on the transparent disc or plate 10. In addition to the indicating means directly associated with stop 12 per se, an indicator 39 is provided on the driving mechanism. Thus, slide 21 moves along a scale 42 fixed to housing 2, as can be best seen in FIG. 12.

Figure 14:
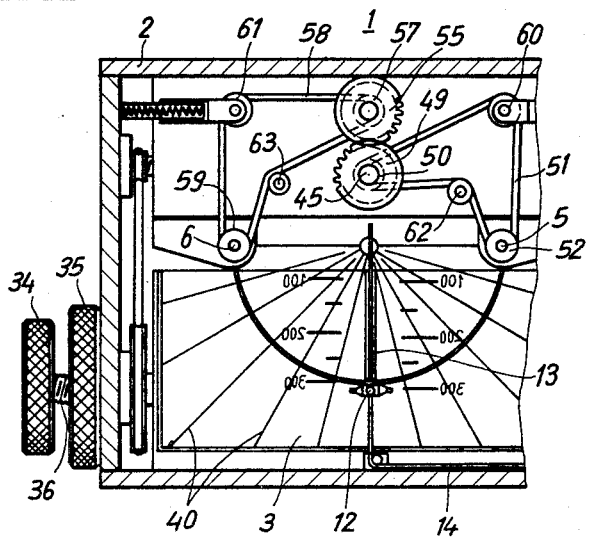
FIG. 14 is a partial rear view of the device shown in FIG. 12, taken along the line C–D of FIG. 13.

FIGS. 13 and 14 show part of the drive for varying the curvature and the length of the arc of flexible elastic rod 4. A shaft 45 is supported in housing 2 by means of an anti-friction bearing 46, and projects from rear wall 48 of the housing, the shaft 45 being operable by a cam mechanism as will be described hereinafter. A spur gear 49 and a pulley 50 are connected to shaft 45, and rotary movement, imparted to shaft 45, is transmitted by pulley 50 and belt 51 to another pulley 52 secured to bearing pin 5, which is rotatably supported in housing 2 by anti-friction bearings 53 and 54. Spur gear 49 meshes with a spur gear 55 secured on a shorter shaft 67 mounted in housing 2 by means of an anti-friction bearing 56. A belt pulley 57 is secured to shaft 67 and connected by means of a belt 58 to a belt pulley 59 secured to the other bearing pin 6 carrying the radius link for rod 4.

During angular displacement of shaft 45, equal, but oppositely directed, bending moments are imparted to elastic rod 4 at its point of support on pin 5 and at its engagement with radius link 8. Tension on belts 51 and 58 is maintained by tension rollers 60 and 61 biased by springs in housing 2, and a sufficient length of contact with belt pulleys 50, 52, 57 and 59 is ensured by guide rollers 62 and 63 mounted in housing 2.

When the friction between rod 4 and radius link 8 is sufficiently low, the drive for bearing pin 6 carrying radius link 8 can be omitted, whereby an alternate embodiment is obtained wherein the parts 49, 55, 57, 58, 59, 61 and 63 are eliminated.

In advance of the mechanism shown in FIGS. 12, 13 and 14, there is arranged a cam mechanism shown in FIGS. 15 and 16. The end of shaft 45 projecting from housing 2 is secured in a driving disc 87 supported by means of an anti-friction bearing 88 in a housing 71 of the cam mechanism. The cam mechanism is secured to the mechanism shown in FIGS. 12, 13 and 14. FIG. 15 is a sectional view of the cam mechanism, and FIG. 16 shows the same mechanism, with cover 72 partly removed, as viewed by the gunner.

A shaft 73 extends from one end of housing 71 of cam mechanism 70, and has transmitted thereto, in a known manner, the vertical angle measured from the bearing of the weapon by means of a parallelogram linkage or of a flexible shaft (not shown). Shaft 73 is supported in housing 71 by means of anti-friction bearing 74, and has secured thereto, within housing 71, a bevel gear 75 meshing with a bevel gear 77 secured on a shaft 76. Shaft 76 is supported in an anti-friction bearing 78, and has secured thereto a cam 79 engaged by a cam follower 81 biased into engagement with cam 79 by a spring 80. Follower 81 is secured to a slide 83 which is guided by guide means 82 in housing 71. This slide has a journal 84 to which is pivotally connected one end of a crank link 85. The other end of crank link 85 is connected to a crank pin 86 which is eccentrically mounted on disc 87.

Cam mechanism 70 converts the vertical angle $\gamma$ imparted to shaft 73 into the angle $\lambda$ of the output shaft 45. The angle $\lambda$ is, as fully explained in the foregoing discussion, a function of the vertical angle $\gamma$ and also a function of the angle $\Upsilon$ corresponding to the inclination of the plane of flight.

FIG. 17 shows an exemplary illustration of the lead determining device on a reflector sight 90 which is represented in a simplified form and in section. Daylight, or illumination from a source of light, enters housing 91 of reflector sight 90 in the direction of arrow L. In the path or rays of the incident light, there is arranged the device 1 for determining the lead. As stated, this device includes a window 3 through which may be seen the flexible elastic rod 4, and the division marks 40 are reproduced in the field of view of the sight on a semi-transparent reflecting disc or plate 92. A plane mirror 93, positioned at an angle of 45° to the incident light, directs the incident light to a collecting or convex lens 94 so that it impinges on the disc or plate 92 which is likewise arranged at an angle of 45° to the path of the light rays. The portion of the light passing through reflecting disc 92 is reflected by a concave mirror 95 arranged behind disc or plate 92, and reproduces, on mirror 95, the flexible elastic rod 4 and the division marks 40 at infinity.

A gunner looking in the direction of the arrow F through sight 90 sees, on reflecting disc or plate 92 and superposed on the above-described reproduction, the image of the target moving along a division mark. By observation, he can obtain, at an intersection of a division mark 40 with the reproduction of the flexible elastic rod 4, an aiming point when the target has reached this intersection.

To prevent penetration of foreign matter into sight 90, its light tunnel 98 is sealed at both ends by means of transparent discs 96 and 97, one of which may be designed as a colored disc. To the right of the determining device there are arranged the knobs 34 and 35 used for adjustment of the lead curve in accordance with a ballistic characteristic of the weapon and according to the estimated or measured target velocity.

Considered in the direction of the arrow F, the associated cam mechanism 70 is arranged behind the lead determining device 1 which is mounted above window 3 of device 1. A vertical angle $\gamma$ of a weapon, transmitted by known means to shaft 73 of cam mechanism 70, is converted by the cam mechanism to an angle $\lambda = f(\gamma)$ and fed by the means of FIGS. 12 through 16, indicated by broken lines, into the lead determining device 1 containing the flexible elastic rod 4 simulating the lead curve.

FIG. 18 illustrates, in a schematic and simplified manner, an alternate embodiment of the flexible elastic rod, its support and its drive, and which can be inserted in place of the device shown in FIGS. 12 through 14 between the two spaced plane and parallel transparent discs or plates 9 and 10. In FIG. 18, the flexible elastic rod is illustrated as a continuous ring 100 supported at diametrically opposite points 101 and 102. The apex 108 of that arc which is not reproduced in the sight is engaged by a follower 103 which moves on a perpendicular bisector 104 of the chord 105 in accordance with a function of the vertical angle $\gamma$ of the respective weapon. With respect to the embodiment shown in FIG. 18, mathematical relations similar to those described for the angular function of $\lambda$ of the other embodiment can be set up, and a corresponding drive devised in accordance with the function thus determined and by one skilled in the art having reference to the description above. In order to take into consideration another ballistic characteristic of the weapon, or different velocities of the target, or in place of the above mentioned follower 103, a follower 106 may be provided which engages the apex 107 of that arc of rod 100 reproduced in the sight. A second curvature of rod 100 and a second lead curve are shown in FIG. 18 at 109, as indicated in broken lines.

While specific embodiments of the invention have been shown and described in detail to illustrate the application of the principles of the invention, it will be understood that the invention may be embodied otherwise without departing from such principles.

What is claimed is:

1. In a device for determining the lead in sights of weapons tracking flying targets, and including mans providing, in the field of view of the sight, at least one division mark, which can be made to coincide with the apparent flight direction of the target, and a lead curve intersecting the division mark: the improvement comprising a flexible elastic rod simulating the lead curve and having a variable curvature.

2. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible rod simulating the lead curve and having a variable curvature and a variable length of arc between the ends of a chord subtending the arc.

3. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; and means connected to said rod and operatively associated with the weapon and effective to vary the curvature of said rod in accordance with the vertical angle of the weapon.

4. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; means clamping one end of said rod in a bearing pin rotatable about an axis perpendicular to said rod; and a radius link slidably engaging the other end of said rod and mounted on a second bearing pin rotatable abou an axis perpendicular to said rod.

5. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; means clamping one end of said rod in a bearing pin rotatable about an axis perpendicular to said rod; a radius link slidably engaging the other end of said rod and mounted on a second bearing pin rotatable about an axis perpendicular to said rod; and driving means connected to said first bearing pin and operatively associated with the weapon, said driving means rotating said first bearing pin in accordance with the vertical angle of the weapon; said second bearing pin being freely rotatable.

6. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; means clamping one end of said rod in a bearing pin rotatable about an axis perpendicular to said rod; a radius link slidably engaging the other end of said rod and mounted on a second bearing pin rotatable about an axis perpendicular to said rod; transmission means interconnecting said first and second bearing pins for conjoint and equal rotation in opposed directions; and driving means operatively connected to said pins and operatively associated with the weapon and effective to rotate said pins in accordance with the vertical angle of the weapon.

7. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; means clamping one end of said rod in a bearing pin rotatable about an axis perpendicular to said rod; a radius link slidably engaging the other end of said rod and mounted on a second bearing pin rotatable about an axis perpendicular to said rod; a pair of slides mounted for displacement toward and away from each other; and means for mutually displacing said slides in equal amounts in opposed directions; each of said slides supporting a respective one of said bearing pins.

8. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; means clamping one end of said rod in a bearing pin rotatable about an axis perpendicular to said rod; a radius link slidably engaging the other end of said rod and mounted on a second bearing pin rotatable about an axis perpendicular to said rod; a stop engaging said rod intermediate the ends of its arc; and means operable to displace said stop along a perpendicular bisecting the chord subtending the arc and extending between said bearing pins.

9. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; means clamping one end of said rod in a bearing pin rotatable about an axis perpendicular to said rod; a radius link slidably engaging the other end of said rod and mounted on a second bearing pin rotatable about an axis perpendicular to said rod; a pair of slides mounted for displacement toward and away from each other; means for mutually displacing said slides in equal amounts in opposed directions; each of said slides supporting a respective one of said bearing pins; a stop engaging said rod intermediate the ends of its arc; means operable to displace said stop along a perpendicular bisecting the chord subtending the arc and extending between said bearing pins; and means operatively interconnecting said stop and said slides for conjoint displacement.

10. In a device for determining the lead in sights of weapon tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; means clamping one end of said rod in a bearing pin rotatable about an axis perpendicular to said rod; a radius link slidably engaging the other end of said rod and mounted on a second bearing pin rotatable about an axis perpendicular to said rod; a stop engaging said rod intermediate the ends of its arc; means operable to displace said stop along a perpendicular bisecting the chord subtending the arc and extending between said bearing pins; an indicator carried by said stop; and at least one scale cooperable with said indicator and calibrated in accordance with the adjusted target velocities for at least one ballistic characteristic of the weapon.

11. In a device for determining the lead in sights of weapon tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; means clamping one end of said rod in a bearing pin rotatable about an axis perpendicular to said rod; a radius link slidably engaging the other end of said rod and mounted on a second bearing pin rotatable about an axis perpendicular to said rod; a stop engaging said rod intermediate the ends of its arc; means operable to displace said stop along a perpendicular bisecting the chord subtending the arc and extending between said bearing pins; an indicator carried by said stop; and at least one scale cooperable with said indicator and calibrated in accordance with the adjusted target velocities for at least one ballistic characteristic of the weapon; said scale being provided on a transparent plate positioned in the field of view of the sight.

12. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; means clamping one end of said rod in a bearing pin rotatable about an axis perpendicular to said rod; a radius link slidably engaging the other end of said rod and mounted on a second bearing pin rotatable about an axis perpendicular to said rod; a pair of slides mounted for displacement toward and away from each other; means for mutually displacing said slides in equal amounts in opposed directions; each of said slides supporting a respective one of said bearing pins; an indicator on one of said slides; and a scale cooperable with said indicator and calibrated in adjusted target velocities for at least one ballistic characteristic of the weapon.

13. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature, said rod being in the form of an endless loop; guide means slidably embracing said loop at diametrically opposite points; and displaceable means engaging said loop intermediate said guide means to vary the curvature and the length of the arc of said loop visible in the field of view of the sight.

14. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature, said rod being in the form of an endless loop; guide means slidably embracing said loop at diametrically opposite points; and displaceable means engaging said loop intermediate said guide means to vary the curvature and length of the arc of said loop visible in the field of view of the sight; said guide means being displaceable along a perpendicular bisecting the chord subtending the arcs of said loop and extending between said guide means.

15. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature, said rod being in the form of an endless loop; guide means slidably embracing said loop at diametrically opposite points; displaceable means engaging said loop intermediate said guide means to vary the curvature and the length of the arc of said loop visible in the field of view of the sight; said guide means being displaceable along a perpendicular bisecting the chord subtending the arcs of said loop and extending between said guide means; and driving means connected to said displaceable means and operatively associated with the weapon, and effective to move said displaceable means in accordance with the elevation of the weapon.

16. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature, said rod being in the form of an endless loop; guide means slidably embracing said loop at diametrically opposite points; displaceable means engaging said loop intermediate said guide means to vary the curvature and the length of the arc of said loop visible in the field of view of the sight; said guide means comprising radius links through which said loop extends, and said radius links being angularly adjustable about axes parallel to the plane of the loop; and means for conjointly angularly adjusting said radius links in accordance with the target velocity and a ballistic characteristic of the weapon.

17. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; means engaged with said rod at opposite ends of the chord subtending the arc thereof and adjustable to adjust the curvature of said rod; and a pair of spaced parallel plane transparent plates between which said rod is disposed, said plates guiding said rod during adjustment of the curvature thereof.

18. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; means engaged with said rod at opposite ends of the chord subtending the arc thereof and adjustable to adjust the curvature of said rod; a pair of spaced parallel plane transparent plates between which said rod is disposed, said plates guiding said rod during adjustment of the curvature thereof; and a plurality of radially extending division marks on one of said transparent plates for cooperation with said rod.

19. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; guide means engaging said rod at opposite ends of the chord subtending the arc thereof, said guide means being angularly displaceable about axes extending perpendicular to said rod; a cam; means operatively associated with the weapon to adjust said cam angularly in accordance with the elevation of the weapon; and driving means, including a cam follower engaged with said cam, for adjusting at least one of said guide means in accordance with the angular adjustment of said cam.

20. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; guide means engaging said rod at opposite ends of the chord subtending the arc thereof, said guide means being angularly displaceable about axes extending prependicular to said rod; a cam; means operatively associated with the weapon to adjust said cam angularly in accordance with the elevation of the weapon; and driving means, including a cam follower engaged with said cam, for adjusting at least one of said guide means in accordance with the angular adjustment of said cam; said cam comprising a circular disc mounted for angular adjustment about an axis eccentric thereto.

21. In a device for determining the lead in sights of weapons tracking flying targets, and including means providing, in the field of view of the sight, at least one division mark, which can be made to coincide with the apparent flight direction of the target, and a lead curve intersecting the division mark: the improvement comprising a flexible elastic rod simulating the lead curve and having a variable curvature; said sight comprising a reflector sight; and an optical system effective to reproduce the image of said rod in the field of view of said sight.

References Cited

UNITED STATES PATENTS

| 1,412,758 | 4/1922 | Sperry et al. | 33—49 |
| 2,372,613 | 3/1945 | Svoboda | 33—49 |
| 3,024,536 | 3/1962 | Kuhlenkamp | 33—49 |

FOREIGN PATENTS

| 912,151 | 4/1946 | France. |

ROBERT B. HULL, *Primary Examiner.*